United States Patent [19]

Yokev et al.

[11] Patent Number: 5,712,867
[45] Date of Patent: Jan. 27, 1998

[54] TWO-WAY PAGING APPARATUS HAVING HIGHLY ACCURATE FREQUENCY HOPPING SYNCHRONIZATION

[75] Inventors: Hanoch Yokev, Ramat-Gan; Yehouda Meiman, Rishon Letzian; Shimon Peleg, Hod Hasharon; Oren Yokev, Ramat-Gan; Boaz Porat, Haifa, all of Israel

[73] Assignee: NEXUS 1994 Limited, London, England

[21] Appl. No.: 398,372

[22] Filed: Mar. 3, 1995

Related U.S. Application Data

[63] Continuation-in-part of Ser. No. 158,441, Nov. 24, 1993, Pat. No. 5,430,759, which is a continuation-in-part of Ser. No. 961,776, Oct. 15, 1992, Pat. No. 5,335,246, which is a continuation-in-part of Ser. No. 140,716, Oct. 21, 1993, Pat. No. 5,379,047.

[51] Int. Cl.$^6$ .............. H04K 1/04; H04J 3/06; H04L 7/027
[52] U.S. Cl. ............ 375/202; 370/350; 340/825.44; 380/34; 368/47; 455/38.1
[58] Field of Search ............... 375/200, 354, 375/362, 371, 377, 293, 205; 370/58.1, 60, 94.1, 50, 66, 18, 19, 93, 95.1, 95.3, 20, 100.1, 102, 104.1, 103, 24, 17, 94.2, 105, 110.1; 368/47; 380/34, 33; 340/825.44, 825.2, 825.21, 825.26, 825.27, 825.22, 870.04; 455/51.1, 38.2, 38.3, 67.1, 226.1, 38.1, 51.2, 53.1, 54.1

[56] References Cited

U.S. PATENT DOCUMENTS

| | | | |
|---|---|---|---|
| 3,706,933 | 12/1972 | Bidell et al. | 325/479 |
| 4,168,529 | 9/1979 | Tomlinson | 364/728 |
| 4,229,741 | 10/1980 | Groth, Jr. | 370/24 |
| 4,287,597 | 9/1981 | Paynter et al. | 455/12 |
| 4,494,211 | 1/1985 | Schwartz | 364/571 |
| 4,617,674 | 10/1986 | Mangulis et al. | 375/1 |
| 4,744,083 | 5/1988 | O'Neill et al. | 371/22 |
| 4,845,491 | 7/1989 | Fascenda et al. | 340/825.44 |

(List continued on next page.)

FOREIGN PATENT DOCUMENTS

| | | | |
|---|---|---|---|
| 0 565 180A2 | 10/1993 | European Pat. Off. | H04Q 7/02 |
| 0 703 514A1 | 3/1996 | European Pat. Off. | G04G 7/02 |
| WO88/09091 | 11/1988 | WIPO | H04B 7/00 |
| WO94/05110 | 3/1994 | WIPO | H04M 11/00 |
| WO95/14935 | 6/1995 | WIPO | G01S 5/04 |

OTHER PUBLICATIONS

"International Search Report for International Application No. PCT/GB96/00268; Date of Completion—Jun. 6, 1996; Authorized Officer—T. Pieper", 6 pages.

*Primary Examiner*—Wellington Chin
*Assistant Examiner*—William Luther
*Attorney, Agent, or Firm*—Schwegman, Lundberg, Woessner & Kluth, P.A.

[57] ABSTRACT

A method, apparatus and system is described for distributing accurate time-of-day information from an existing telecommunications infrastructure without modifying the existing infrastructure. In particular, the system comprises a base station device which continually receives extremely accurate time-of-day information from, by way of example and not by limitation, a GPS (Global Positioning Satellite) system, a local atomic clock, or a wired or wireless time standard. The base station periodically places time-of-day information into standard paging packets for transmission over a standard paging network. The paging packets are sent over telephone lines to the paging terminal for transmission whenever a time slot for transmission becomes available. The base station device records the actual time of transmission of the paging packet containing the time of day information and prepares the next time-of-day packet by placing the exact transmission time of the previous time-of-day packet sent. In the receiver, an algorithm is used to extrapolate the current time-of-day based on the history of transmitted packets containing measured time-of-day information of past transmissions.

3 Claims, 9 Drawing Sheets

U.S. PATENT DOCUMENTS

| | | | |
|---|---|---|---|
| 5,089,814 | 2/1992 | DeLuca et al. | 340/825.49 |
| 5,111,478 | 5/1992 | McDonald | 375/1 |
| 5,130,987 | 7/1992 | Flammer | 370/103 |
| 5,189,411 | 2/1993 | Collar et al. | 340/825.14 |
| 5,325,088 | 6/1994 | Willard et al. | 340/825.2 |
| 5,363,377 | 11/1994 | Sharpe | 455/55.1 |
| 5,408,444 | 4/1995 | Kita et al. | 368/47 |
| 5,436,936 | 7/1995 | Haapanen | 340/825.2 |
| 5,530,704 | 6/1996 | Gibbons et al. | 340/825.2 |
| 5,532,692 | 7/1996 | Tatsuya | 340/825.2 |
| 5,537,101 | 7/1996 | Nakajima et al. | 340/825.21 |

TWO-WAY PAGING APPARATUS HAVING HIGHLY ACCURATE FREQUENCY HOPPING SYNCHRONIZATION

CROSS-REFERENCE TO RELATED APPLICATIONS

The present patent application is a continuation-in-part of U.S. patent application Ser. No. 158,441, now U.S. Pat. No. 5,430,759 entitled "LOW-POWER FREQUENCY-HOPPED SPREAD SPECTRUM REVERSE PAGING SYSTEM" filed Nov. 24, 1993, issued Jul. 4, 1995, which in turn is a continuation-in-part of U.S. patent application Ser. No. 961,776, now U.S. Pat. No. 5,335,246 entitled "PAGER WITH REVERSE PAGING FACILITY" filed Oct. 15, 1992, issued Aug. 2, 1994, which in turn is a continuation-in-part of U.S. patent application Ser. No. 140,716, now U.S. Pat. No. 5,379,047 entitled "REMOTE POSITION DETERMINATION" filed Oct. 21, 1993, issued Jan. 3, 1995, all of which, including the microfiche appendices, are hereby incorporated by reference and which are all commonly assigned.

FIELD OF THE INVENTION

The present invention relates generally to radio communication systems and in particular the present invention relates to synchronizing radio transmitters which share a common communications medium. The present invention also relates to a method and apparatus for providing highly accurate time-of-day information at a relatively low cost.

BACKGROUND OF THE INVENTION

Radio transmitters which share a communications medium must be synchronized to ensure maximal utilization of the frequency space. Unsynchronized transmitters which simultaneously share the same frequency space will cause interference with one another resulting in neither transmitter being successful in its transmission. In the area of Time Division Multiple Access (TDMA), multiple transmitters must have a protocol for sharing the same frequency space. In the area of Frequency Division Multiple Access (FDMA), including spread spectrum, multiple transmitters must use codes which are synchronized with the receiver to ensure intelligible communications. Unsynchronized spread spectrum transmitter/receiver pairs cannot communicate.

Techniques for synchronization may take the form of an a priori knowledge of the time of day such as having the local clock of a transmitter which is periodically synchronized to a global clock. This technique requires special hardware in the transmitter to ensure that the time-of-day information is accurate at the time it is transmitted. If the time-of-day message containing the time information is transmitted late, the information content of the message is obsolete and inaccurate. An example of a prior art time transmission is the radio broadcasts from the National Bureau of Standards transmitted by radio from Fort Collins, Colo., USA.

There is a need in the art for accurate time-of-day transmissions which are accurate and can be transmitted inexpensively to a plurality of users from an existing telecommunications infrastructure without modifying the existing infrastructure. There is a further need in the art for a receiver system which can determine the accurate time-of-day in an inexpensive manner. There is a further need in the art for a shared channel communication system which can synchronize a plurality of transmitters and receivers using synchronization information transmitted using an existing telecommunications infrastructure without modifying the existing infrastructure.

SUMMARY OF THE INVENTION

The above mentioned needs in the art are addressed by the present invention. The present invention is a method, apparatus and system for distributing accurate time-of-day or synchronization information from an existing telecommunications infrastructure without modifying the existing infrastructure. In particular, the system includes a base station device which continually receives extremely accurate time of day information from, by way of example and not by limitation, a GPS (Global Positioning Satellite) receiver, a local atomic clock, or a wired or wireless time standard. The accurate time of day system periodically places time-of-day information into standard paging packets for transmission over a standard paging network. The paging packets are sent over telephone lines to the paging terminal and are transmitted whenever a time slot for transmission becomes available. The base station device is equipped with a paging receiver which records the exact time of transmission of the paging packet containing the time of day information and prepares the next time-of-day packet by placing the exact transmission time of the last packet sent. In a paging receiver, an algorithm is used to extrapolate the current time-of-day based on the history of transmissions giving the exact time-of-day information of past transmissions.

BRIEF DESCRIPTION OF THE DRAWINGS

In the drawings, where like numerals refer to like components throughout the several views.

FIG. 12 is a diagram showing the use of the present invention in synchronizing a watch to an accurate time-of-day.

DETAILED DESCRIPTION OF THE PREFERRED EMBODIMENT

Figure 1:
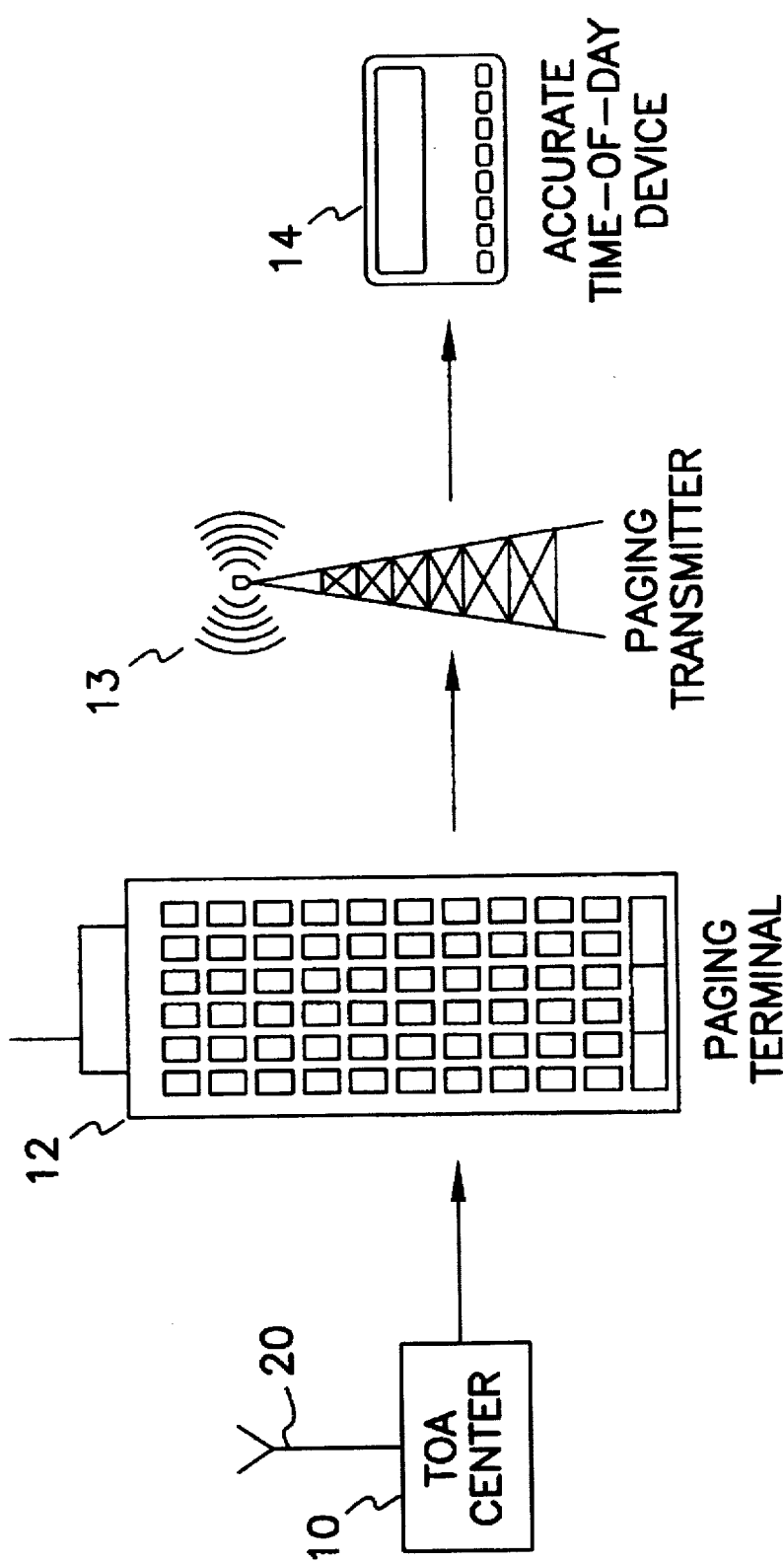
FIG. 1 is an overview of a synchronization system for a shared channel communication system.

The specification for the present invention described herein includes the present description, the drawings, and claims. The present specification also includes the descriptions, drawings, claims as filed and appendices of U.S. patent application Ser. No. 08/158,441 entitled "LOW-POWER FREQUENCY-HOPPED SPREAD SPECTRUM ACKNOWLEDGMENT PAGING SYSTEM" filed Nov. 24, 1993, which are incorporated by reference.

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

System Overview

The present invention is directed to providing an accurate time-of-day or synchronization information to remote mobile units from a base station in an environment in which messages are transmitted in a nondeterministic fashion. In a preferred embodiment of the present invention, the time-of-day messages are used to synchronize frequency hopping spread spectrum transmitters used in reverse paging units as described in the parent application described above. The use of time-of-day information in a preferred embodiment to the present invention is to ensure synchronization between the transmitter and the receiver during frequency hops. The time-of-day messages take the form of paging signals which are typically transmitted with 200 Watts of power at a center frequency of 143.160 MHz, with an NRZ FSK data rate of 512, 1200 or 2400 bps using a standard paging format such as POCSAG or other industry standard formats.

Those skilled in the art will readily recognize that the present invention finds its application in a wide variety of technologies in which accurate time-of-day information is needed at remote and mobile locations without the attendant costs associated with highly accurate time-of-day clocks, such as atomic clocks or GPS receivers. The present invention provides accurate time-of-day information transmitted using an inexpensive communication medium such as the paging transmitters typically found in almost every populated area of the world. Paging transmitters are capable of transmitting short messages in a very inexpensive fashion to a wide area of recipients who are carrying inexpensive receivers. The present invention is directed to a time-of-day transmission system which does not require the modification of an installed paging infrastructure. The present invention sends the time-of-day information packets to the paging transmitter where the packets are processed and transmitted like any other type of paging message.

The time-of-day paging messages that are transmitted by the paging terminal contain time-of-day information which may be received by any system or person equipped with an inexpensive paging receiver which operates according to the synchronization algorithm described in more detail below. Each time-of-day message transmitted by the paging terminal contains information about the time of transmission of the previous time-of-day message. The time-of-day message may also contain a history of the transmission times of several past time-of-day messages along with a serial code. The paging receivers receive the time-of-day information from the paging messages and extrapolate the exact current time-of-day from the exact transmission times of transmissions of the past time-of-day paging messages. In this fashion, the time-of-day paging transmissions do not need to have the time of transmission correspond exactly to the content of the time-of-day paging message. Because of this decoupling between the current time-of-day and the current time-of-day transmission packet, the packets may be handled as any other paging message to be queued up and transmitted as traffic allows. The increased overhead to a paging transmitter terminal to add these time-of-day packets is minimal.

The present invention finds its application primarily in the area of synchronization of transmitters and receivers in shared channel communication systems such as TDMA, FDMA, and any variety of spread spectrum communications. The present invention also finds utility wherever accurate and inexpensive time-of-day information as needed, such as synchronizing wrist watches and the like, providing accurate time-of-day to computers, location systems, and anywhere else where accurate time-of-day would be useful without the attendant costs of expensive atomic clocks or GPS receivers. The accuracy of the present invention rivals that of atomic clocks and GPS receivers without the overhead of an expensive receiver. Those skilled in the art will readily recognize that the present invention is not limited to the use of paging transmitters. The communication medium for transmitting the time-of-day messages could be by wired communications, such as dial-up telephones, local area networks, communication carriers over power line, and any other type of wireless or wired communication systems.

An advantage of the present system over the prior art is that accurate time-of-day information can be made available in virtually any location. Since the time-of-day messages are transmitted using a paging transmitter infrastructure, the paging signals are capable of penetrating deep inside buildings, automobiles and the like. This is in contrast to a GPS receiver which requires an outside antenna having a line-of-sight view of the satellites. In the case where the paging receivers are located at a fixed location, the time-of-day information may be calculated at the receiving site to be even more accurate by adjusting for the known propagation delay between the receiver and the paging transmitter. Also, the present system is very fault-tolerant since the time-of-day message packets contain serial tag numbers to flag when a packet is missed by a receiver. Even in the case of mobile receivers, the exact time of day can be calculated to a high degree of accuracy by averaging the estimated propagation delay from the paging transmitter to the mobile receiver.

Paging Transmitter

FIG. 1 is a simple block diagram of the operation of the preferred embodiment of the present invention. The present invention is basically a closed loop system in which a time-of-day message is sent from a time-of-arrival center 10 to a paging terminal 12 for transmission as a normal paging message. The time-of-day message is not given any special priority or handling by the paging terminal 12, and is simply queued up for transmission as any other paging message. The time-of-day paging message is assembled by the paging terminal 12 with other paging messages and sent to the paging transmitter 13. The paging transmitter 13 then transmits the time-of-day information packet just as it would any other paging message to the wide geographic area served by that particular paging system. An accurate time-of-day device 14, such as a reverse paging unit or the like, receives the time-of-day messages and extrapolates the current time-of-day based on the history of the exact transmission times of the past time-of-day messages.

The generation of the time-of-day messages is performed at the time-of-arrival center 10, which receives and records the exact transmission times of the time-of-day messages from paging transmitter 13 through antenna 20. Time-of-arrival (TOA) center 10 is equipped with an extremely accurate time reference, such as an atomic clock or a GPS receiver, which is used to measure the exact time of reception of the last time-of-day message from paging transmitter 13. The TOA center 10 is positioned at a fixed location in which the distance from the paging transmitter tower 13 and the TOA center 10 is known and therefore the exact propagation delay of the signals is also known. From this known propagation delay, the TOA center 10 calculates the exact time of transmission from the exact time of reception. TOA center 10 then assembles the next time-of-day message packet and places the exact time of transmission of the previous time-of-day message into the current time-of-day message packet and sends it to paging terminal 12. In this fashion, a closed-loop system is assembled which periodically transmits the time-of-day message packets which can be used by the accurate time-of-day device 14 to extrapolate the current time based on the history of past transmissions.

TOA Center Design

Figure 2:
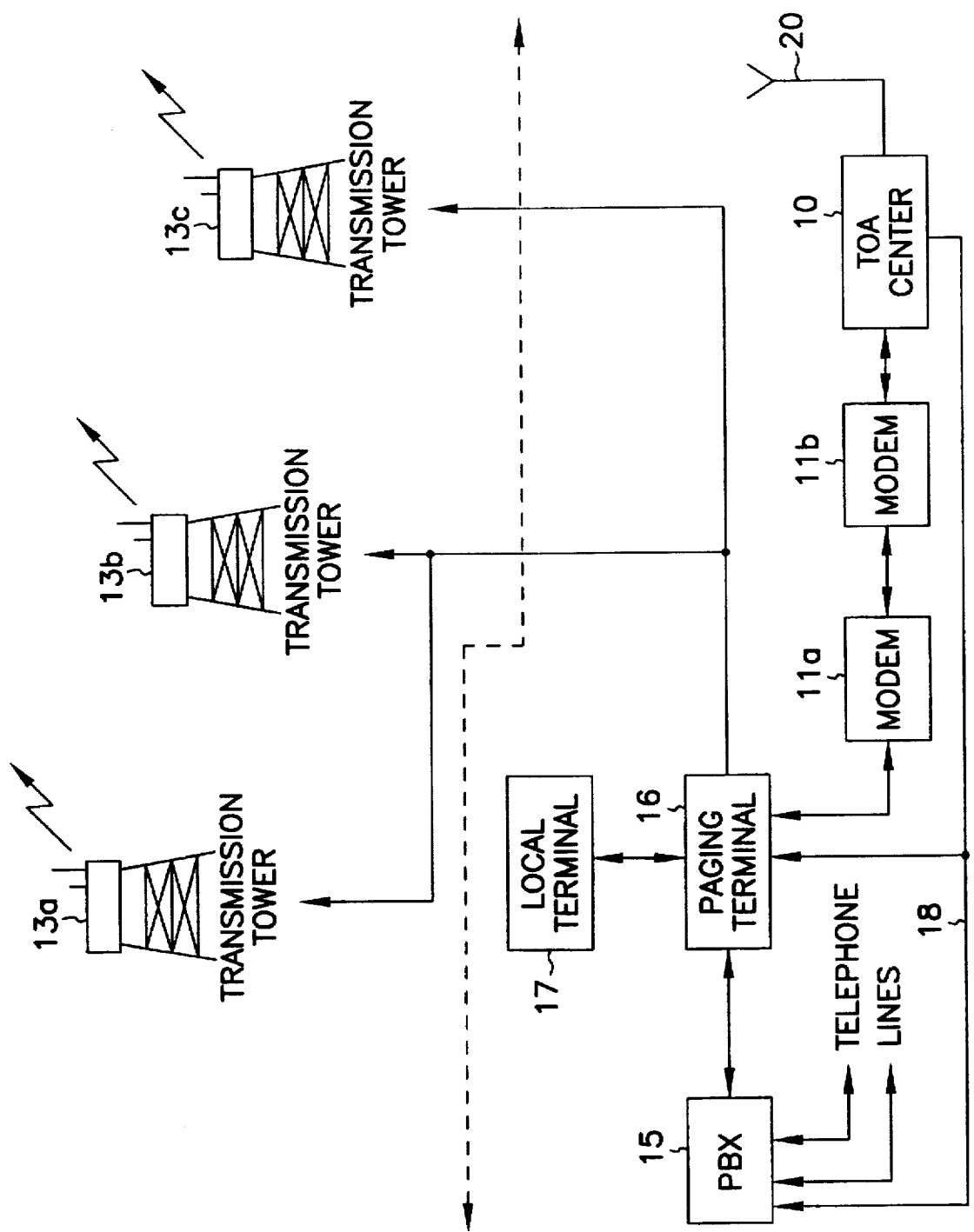
FIG. 2 is a detailed block diagram of the synchronization system for a shared channel communication system.

FIG. 2 is a more detailed block diagram of a typical paging system and the interface of the paging system to the TOA center 10. A paging market is typically serviced by a plurality of transmission towers 13a, 13b, 13c, etc., all of which are controlled by central a paging terminal 16. Paging messages are typically received by paging terminal 16 through a local telephone network. The paging terminal thus has connections to a PBX system where it has dedicated telephone line connections to the local telephone system. The paging terminal may also have a modem connection 11a to other paging terminals serving the geographic market. Modem connections may allow a wide variety of paging messages to be received by paging terminal 16 for transmission in the local geographic market. These types of alternate message connections could be connections to the Internet, personal computers connecting through modems, and the like. Messages for transmission by paging terminal 16 may also require human intervention to decipher and assemble. Thus, a human operator may work through a local terminal 17 to assemble paging messages. These types of paging messages requiring human intervention may be messages received by facsimile or telephone calls or TDD devices used by the hearing impaired. The TOA center 10 may connect to paging terminal 16 by a telephone line connection 18 or through a wired modem connection using modems 11a and 11b. As shown in FIG. 2, TOA center 10 is equipped with a receiving antenna 20 to receive paging messages from the paging transmission towers 13a, 13b, 13c, etc.

Figure 3:
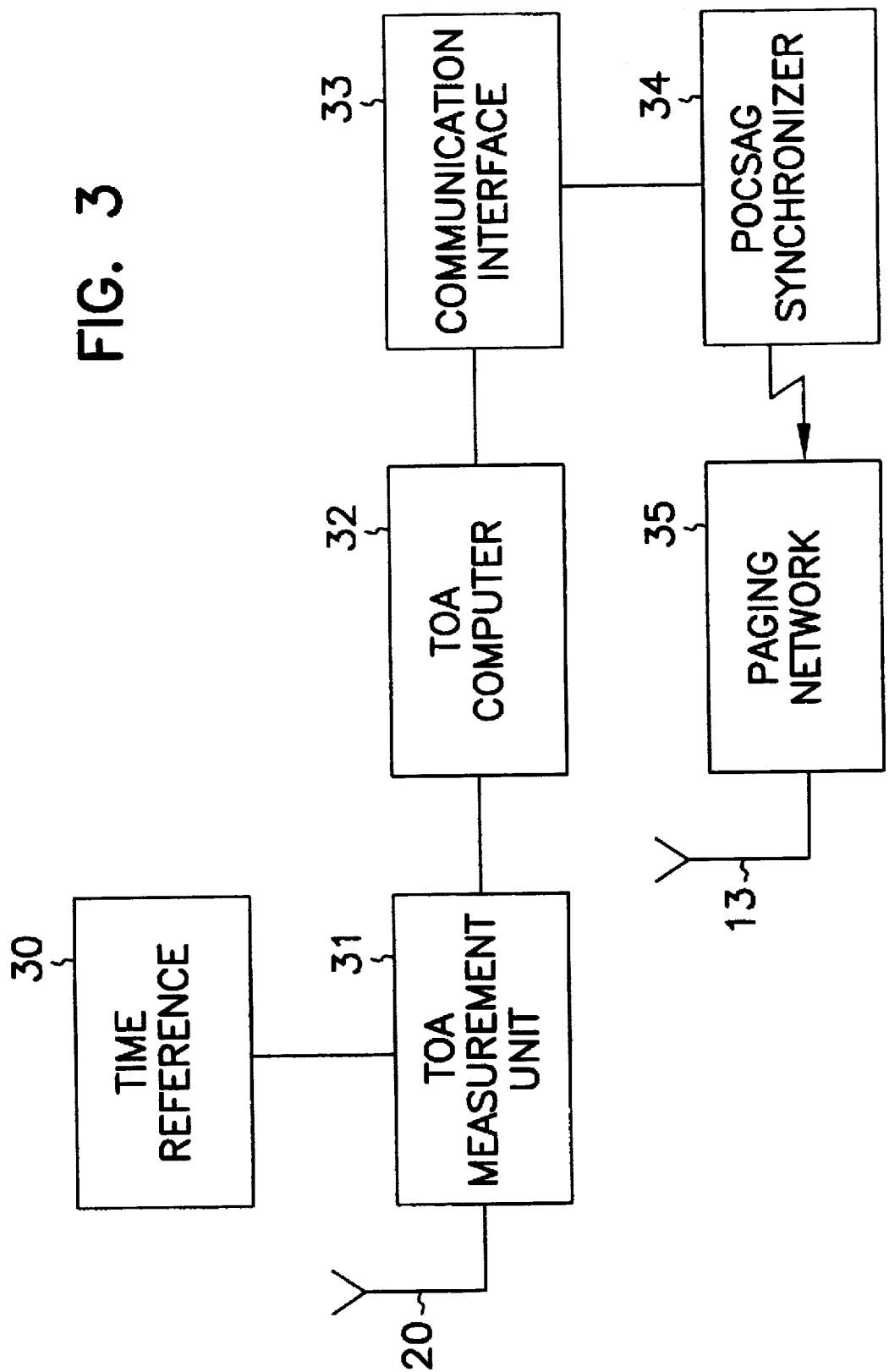
FIG. 3 is a block diagram of the base station time-of-arrival system connected to the paging network.

A more detailed block diagram of the TOA center 10 is shown in FIG. 3. A time-of-day measurement unit 31 is connected to paging receiver antenna 20 for receiving paging messages containing time-of-day information. The TOA measurement unit 31 is equipped with a time reference 30 which provides exact time-of-day information from, for example but not by limitation, an atomic clock, a global positioning satellite (GPS) system, or other types of accurate time references. The TOA measurement unit 31 thus records the exact reception of the time-of-day message from the paging transmitter.

The TOA measurement unit 31 passes the exact time of reception of the time-of-day message to the time-of-arrival computer 32. The TOA computer 32 calculates the exact time of transmission of the paging message based upon the exact time of reception and the known distance or propagation delay from the paging transmitter tower to the TOA measurement unit antenna 20. TOA computer 32 then assembles the time-of-day message packet. Each packet includes a serial number for the present packet, which is an increment of the previous serial number of the previous time-of-day message. The time-of-day message packet includes at least the transmission time of the last time-of-day message packet, but may also include a history of times of reception of the last several time-of-day messages to assist the receivers in their respective extrapolation algorithms. The reception of time-of-day message packets is not guaranteed, and in fact some packets may be lost. The use of serial numbers in the time-of-day packets allows the paging receivers to determine if packets indeed have been missed when the paging receiver is extrapolating the current time-of-day. The use of a history of several transmission times of the last several time-of-day packets assist the paging receivers in the extrapolation algorithm, as described more fully below.

Communication interface 33 receives the next time-of-day packet from TOA computer 32 and passes it to the POCSAG synchronizer 34. A POCSAG synchronizer places the packet in a standard communication protocol format, which in the current embodiment of the present invention is the POCSAG format. Those skilled in the art will readily recognize that the format of the message must be placed in the format used by the local paging system. The local paging system may not necessarily use the POCSAG format, since a wide variety of standards are used throughout the world. In a preferred embodiment of the present invention, the POCSAG format is used for illustrative purposes only.

The POCSAG synchronizer 34 passes the assembled time-of-day message to paging network 35 where it is queued up for transmission with all other paging messages, and is transmitted by the paging transmission tower 13. Due to the variable amount of traffic on the paging network, the time-of-day messages are transmitted at a nondeterministic time. In a preferred embodiment of the present invention, the TOA computer 32 attempts to generate a next time-of-day packet every 60 seconds. The paging network 35 may not be able to transmit the time-of-day packet within the 60-second interval and hence, some messages may get quite backed up. TOA computer 32 cannot generate a next time-of-day message packet until the last one is received. Thus, the TOA computer in the closed loop system of FIG. 3 must wait until the paging network 35 services the time-of-day message packet by transmitting it. As is shown below, the algorithms for extrapolating the current time-of-day from the last time-of-day message packets may suffer an increment more inaccuracy due to the traffic loading on the paging network. Calculations and analysis performed for a fully loaded paging network transmitting time-of-day messages every 60 seconds shows an overhead increase of only 3% in message volume over a 24 hour period.

Synchronization Message Packets

As described above, the preferred embodiment to the present invention is to provide accurate time-of-day information to synchronize transmitters and receivers in a shared channel communication system. These types of communication systems are, for example but not by limitation, frequency division multiple access (FDMA) systems, time division multiple access (TDMA) systems, including all types of spread spectrum systems such as frequency hopping spread spectrum systems and direct sequence spread spectrum systems. Thus, the time-of-day message packets are used as synchronization packets which are utilized by the plurality of transmitters to synchronize their operation with the receivers. In the preferred embodiment of the present invention, each time of day message packet contains the last two times of transmission of the last two time of day message packets (in 32 microsecond resolution), the message serial number and a CRC.

Those skilled in the art will readily recognize that the format of the time-of-day message packets may take on many forms without departing from the spirit and intent of the claimed invention. For example, and not by way of limitation, an equivalent format of the synchronization packet may be to only transmit "delta" data, rather than the exact time of day, to minimize the amount of information needed to be transmitted from the synchronization base station to the remote mobile units. This "delta" data could take the form of the following. Each message could be transmitted at a prescheduled time, such as exactly every 60 seconds. Of course, the prescheduled time is not the actual time of transmission. The current time-of-day synchronization message packet could thus contain information regarding the difference ("delta") between the scheduled time of transmission of the previous message packet (set for example to be every 60 seconds) and the actual reception time of the previous packet. Those skilled in the art will readily recognize many alternate forms of transmitting the exact previous time of transmission of the previous time of day message packet.

Figure 4:
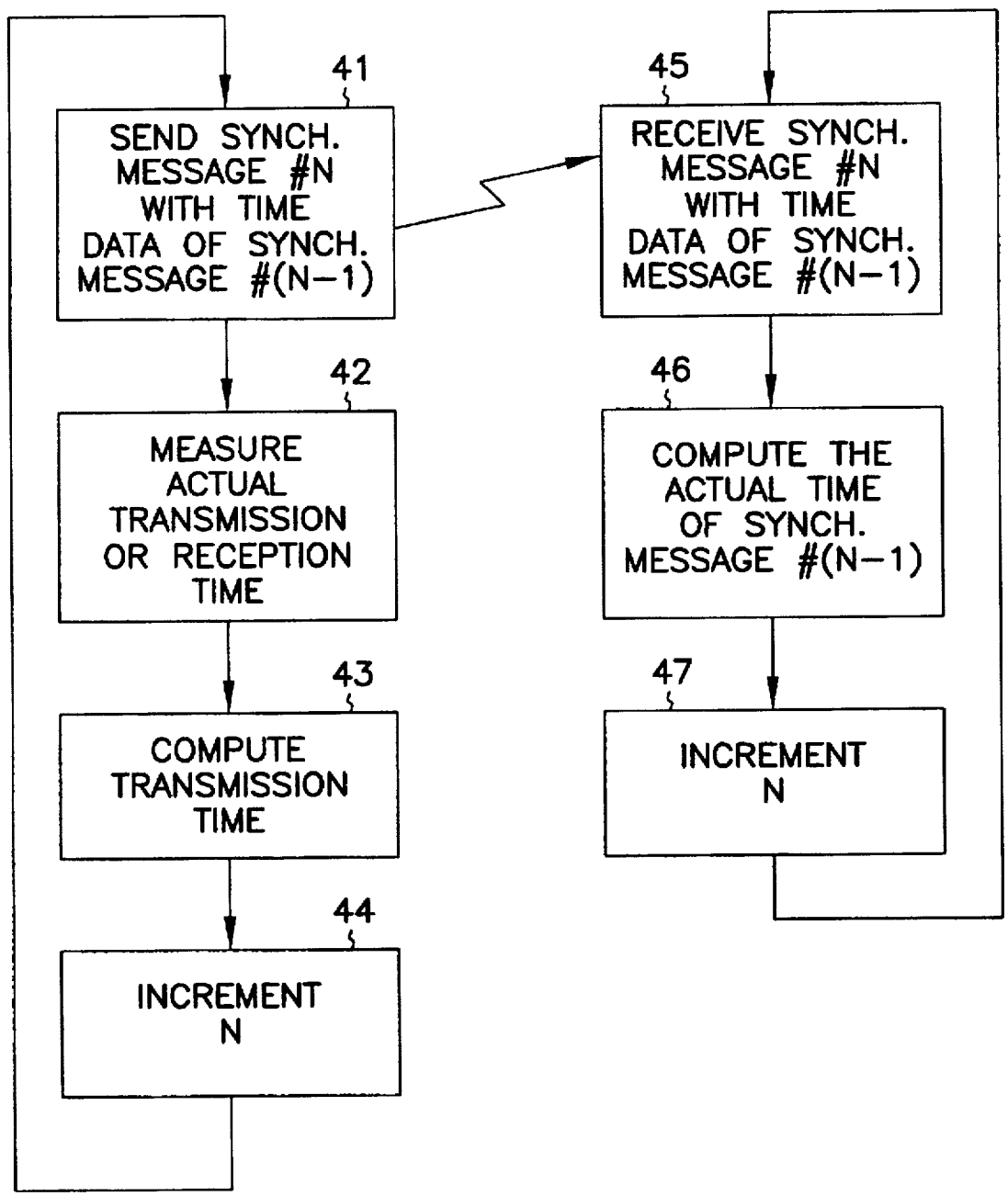
FIG. 4A is a flowchart of the operation of the synchronization base station and the remote mobile unit.
FIG. 4B is a detailed flowchart of the step in FIG. 4A of computing the actual time of the synchronization message at the remote unit.
FIG. 4C is a detailed flowchart of the step in FIG. 4B of correcting the internal time-of-day clock.

FIG. 4A is a block diagram of the operational flow of the synchronization base station and the remote mobile unit (RMU) to demonstrate the parallel operation of the base station and the RMUs. The RMU executes a synchronization algorithm based upon the time of day data from the synchronization (time-of-day) messages received from the base station. The period of transmission of the synchronization messages can be selected according to the needs for accuracy in the receiving remote mobile units. In the preferred embodiment to the present invention, the synchronization messages are transmitted every 60 seconds.

The paging receiver of the RMU, as described more fully below, is equipped with a microprocessor based system which computes the current time of day based on the history of time of transmissions of the previous time-of-day messages. Each paging receiver has a time-of-day dock, which may take many forms. Typically, a time-of-day clock takes the form of a crystal-controlled counter or an internal microprocessor counter, the accuracy of which is controlled by the crystal frequency of the microprocessor dock module. The accuracy of the controlling clock to the microprocessor is subject to a wide variety of sources of error in the frequency, such as temperature variations, crystal frequency drift, etc. To maintain an accurate internal accounting of the exact time-of-day, an internal counter is maintained and typically an adjustment factor is concurrently maintained by the microprocessor which tells the amount of inaccuracy in the time-of-day counter. Thus, this adjustment data is continually updated, rather than continuously adjusting the microprocessor clock or counters. When the accurate time-of-day information is needed for synchronization of the transmitters and receivers, the microprocessor determines that time of day by combining the adjustment data with the time-of-day information held in the counter.

Referring once again to FIG. 4A, synchronization messages are periodically transmitted by the paging transmitter at step 41, and are received by the remote mobile unit or paging receiver at step 45. The time data of the synchronization message (number N) referred to in steps 41 and 45 correspond to the time of day of the exact time of transmission of the previous time-of-day message packet (number N−1).

At the synchronization base station, the TOA measurement unit 31 measures the actual reception time at step 42 of FIG. 4A. TOA computer 32 then computes the transmission time in step 43 by subtracting the known propagation delay between the paging transmitter tower 13 and the antenna 20 of the TOA center 10 from the reception time. In step 44 of FIG. 4A, the algorithm increments the packet number N and the loop beans again with step 41 to transmit the next synchronization message.

At the remote mobile unit, the received message number N with the exact time of day data of synchronization message number N−1 is used to compute the actual time of day in step 46. As in step 44 of the base station, step 47 of the remote mobile unit increments the message number N and the loop begins again at step 45 in which the next message packet is received from the paging transmitter.

FIG. 4B is a detailed flowchart of the step in FIG. 4A of computing the actual time of the synchronization message at the remote unit. FIG. 4C is a detailed flowchart of the step in FIG. 4B of correcting the internal time-of-day clock.

Synchronization Algorithm

As described above, the paging receivers or remote mobile units contain, in the preferred embodiment of the present invention, frequency hopping spread spectrum transmitters. These transmitters are kept synchronized to the base station receivers to within a few hundred microseconds of the exact time of day. The synchronization message packets each contain the complete time-of-day information of the exact transmission time of the previous time-of-day message packet. Also, a history of the transmission times of previous packets, in the form of at least one previous transmission time prior to the last one, is also transmitted to overcome the problem of lost messages at the receiving site. The following describes in detail the principle of operation of the synchronization loop used in the remote mobile units along with a performance assessment by calculations.

Each remote mobile unit (RMU) has an internal clock, which is responsible for proper timing of the RMU transmissions. To ensure coherent communication, the internal clock must be kept in constant synchronization with the base station (BS) clock. In order to achieve this goal, it is necessary to permit synchronization whenever necessary, to periodically update the synchronization in order to compensate for the drift of the internal RMU crystal, and to keep compensating for the drift internally in the RMU during the intervals between updates from the BS.

There are several difficulties that the synchronization loop has to overcome. For example, the timing information from the BS is transmitted only once in about a minute. This interval is not constant, but subject to random variations due to BS message queuing. A typical interval statistics is message transmission in a minimum of 45 seconds, a maximum of 90 seconds, and an average 60 seconds (truncated exponential distribution with mean 15 seconds between these values). Also, there is an inherent delay of one message in the transmitted timing information The transmitted message from the BS contains the serial number of the message, and the time of the previous transmission. It occasionally happens that the time of the previous message is not yet available, and then only the message number is transmitted, without the timing information. There is a non-zero probability that a transmitted synchronization message will not be received by the RMU. A typical value of $P_{miss}$ is 5% Also, the RMU can only identify the input of reception of the synchronization message up to a certain error, called jitter, due to hardware limitations. The jitter typically has a uniform distribution, in the range ±100 microseconds.

Another difficulty is that the drift of the RMU crystal can reach values up to a few hundred parts per million (ppm). Without accurate and continuous compensation of this drift it is doubtful that the synchronization demands could be met. The crystal drift is subject to fluctuations due to temperature, mechanical shocks and vibrations, and random effects. The counter that generates the RMU time from the crystal input has a relatively low resolution, much lower than necessary for fine compensation of the drift. It is therefore necessary to increase the resolution artificially by spreading the compensation over many cycles, such that it will be correct on the average. To add to the difficulties, the synchronization algorithm is implemented on a cheep and slow microcontroller. Therefore, the number of operations is kept to a minimum, only integer arithmetic is permitted, division is avoided if possible, and multiplication is used sparingly.

The main requirements from the synchronization loop are to achieve steady-state timing error (including random errors due to jitter) not exceeding 250 microseconds, ideally 100% (or at least 99.7%) of the time. Also, the algorithm should initialize as fast as possible upon power startup or after lock break and not exceed a few mutes at worst case.

Synchronization Functional Description

Figure 5:
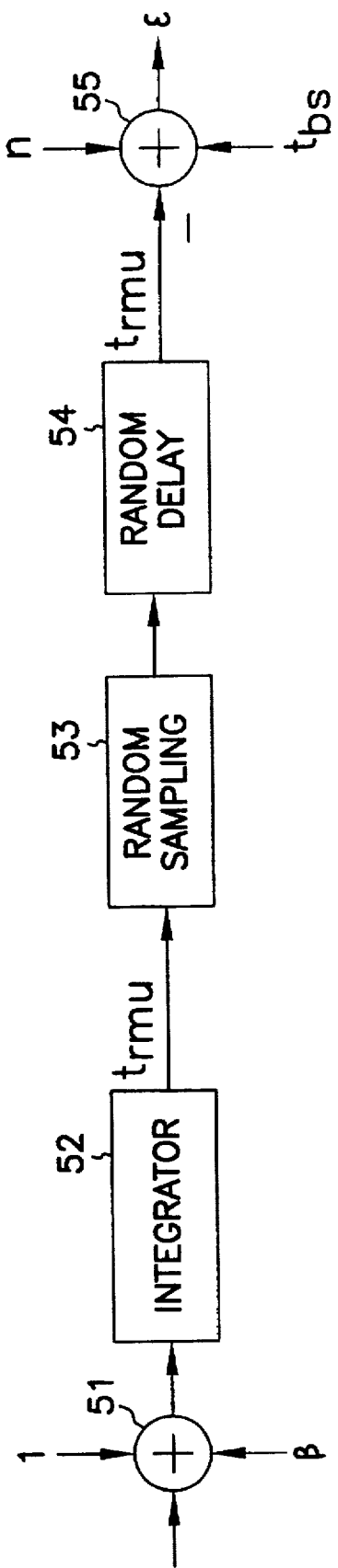
FIG. 5 is a block diagram of an open loop synchronization system.

The system to be controlled consists of the following blocks, as shown in FIG. 5. An integrator 52 representing the RMU counter, in which the nominal input is "1" at 51, which gives upon integration the RMU time $t_{rmu}$. However, due to the crystal drift, there is an additional unknown input β, whose instantaneous value is the drift. For example, a drift of 10 ppm corresponds to β=10⁻⁵. Finally, an external input μ is available for controlling the integrator so as to compensate for the drift and achieve synchronization.

The output of the integrator, $t_{rmu}$, undergoes random sampling 53, determined by the instants of the BS messages. The result is a sequence of times $\{t_{rmu}(k)\}$, where k is the index of the BS message sent at time $t_{bs}(k)$. The sequence $\{t_{rmu}(k)\}$ undergoes a random delay 54 of the index k. Most often the delay is a unit 1, but occasionally it is 2 or more units. The difference between the delayed sequence of the $t_{rmu}$ values and the corresponding $t_{bs}$ values, plus a random jitter noise n, is available for loop closure and controlling the integrator via the external input μ.

The solution for loop closure is an integral controller, represented in the z-domain by the transfer function $$H(z) = K_1 + \frac{K_2}{1-z^{-1}} \quad (1)$$

Figure 6:
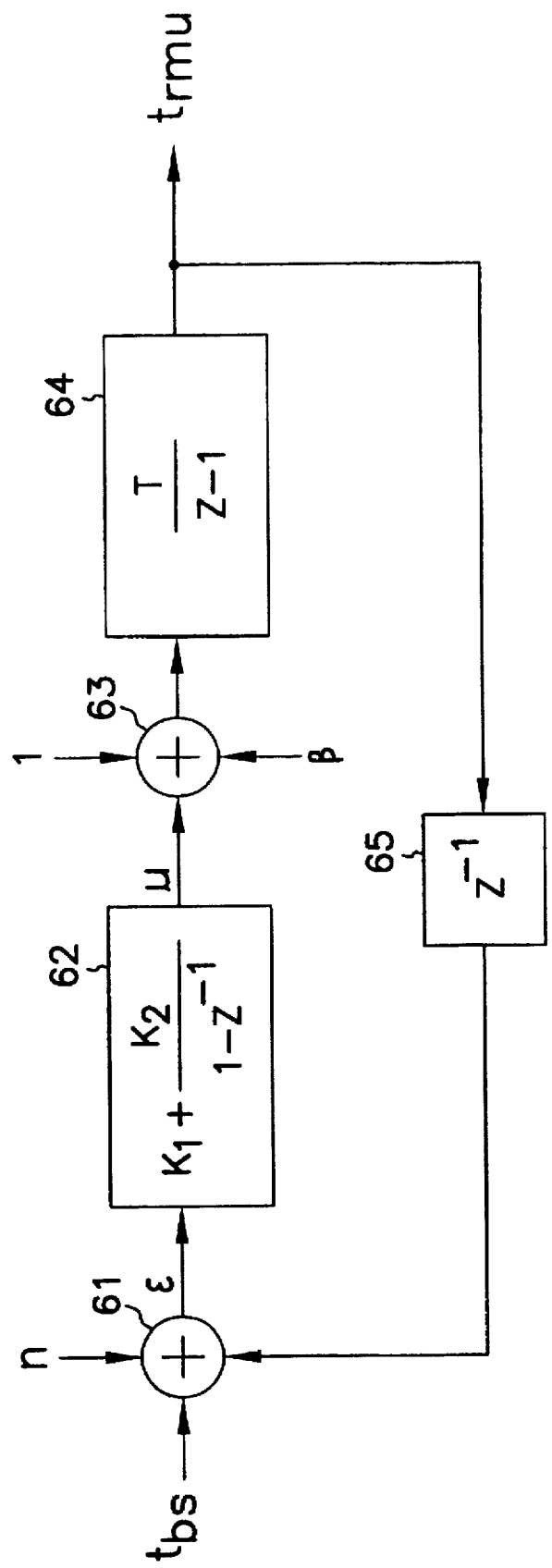
FIG. 6 is a diagram of an ideal closed loop synchronization system.

The function of the integrator is to "learn" the crystal drift and compensate for it in steady state. The proportional gain $K_1$ is for stability, damping, and loop bandwidth control. For the sake of designing the controller (i.e., choosing the gains $K_1$ and $K_2$), as well as analyzing its performance under ideal conditions, we assume that messages are received at intervals of 1 minute exactly, that there are no misses, and that the delay is always 1 message. The real scenario including missed messages is described below by the use of calculations. Under the ideal assumption, the closed loop is shown by the block diagram in FIG. 6. The discretized transfer function of the integrator is $$G(z) = \frac{T}{z-1}, \quad (2)$$

Where T=60 seconds. The closed-loop transfer function from the input $t_{bs}$ to the output $t_{rmu}$ is $$C(z) = \frac{G(z)H(z)}{1+z^{-1}G(z)H(z)} = \frac{(K_1+K_2)Tz^2 - K_1Tz}{z^3 - 2z^2 + (k + K_1T + K_2T)z - K_1T} \quad (3)$$

The controller gains were found by a trial and error procedure, aimed at obtaining the shortest possible settling time under the constraints of stability and good damping. Integral controllers are known to exhibit overshoot in the step response, which increases with the integral control gain. The maximum permitted overshoot limits this gain. The chosen values of the controller gains are:

$$K_1=0.005, K_2=0.001. \quad (4)$$

Figure 7:
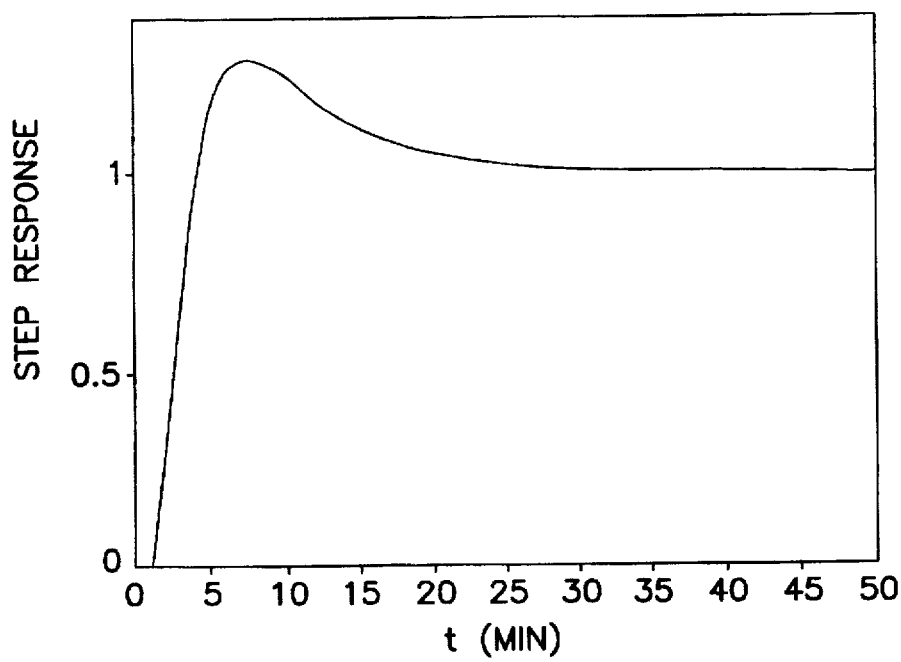
FIG. 7 is a graphical representation of the step response of the closed loop system with T=60 seconds.

The step response of the ideal closed-loop system with these gains is shown in FIG. 7. As is shown, the damping is good, the overshoot is about 35%, and the settling time is about 30 mutes. However, the time to reach the final value (before the overshoot starts) is much shorter: about 4 minutes.

Figure 8:
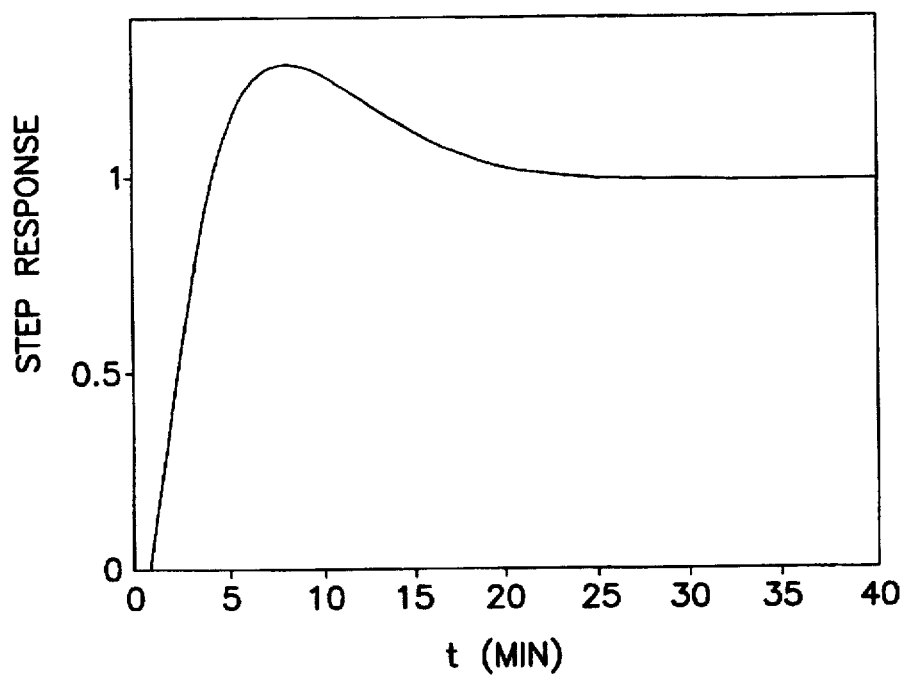
FIG. 8 is a graphical representation of a step response of the closed loop system with T=45 seconds.
Figure 9:
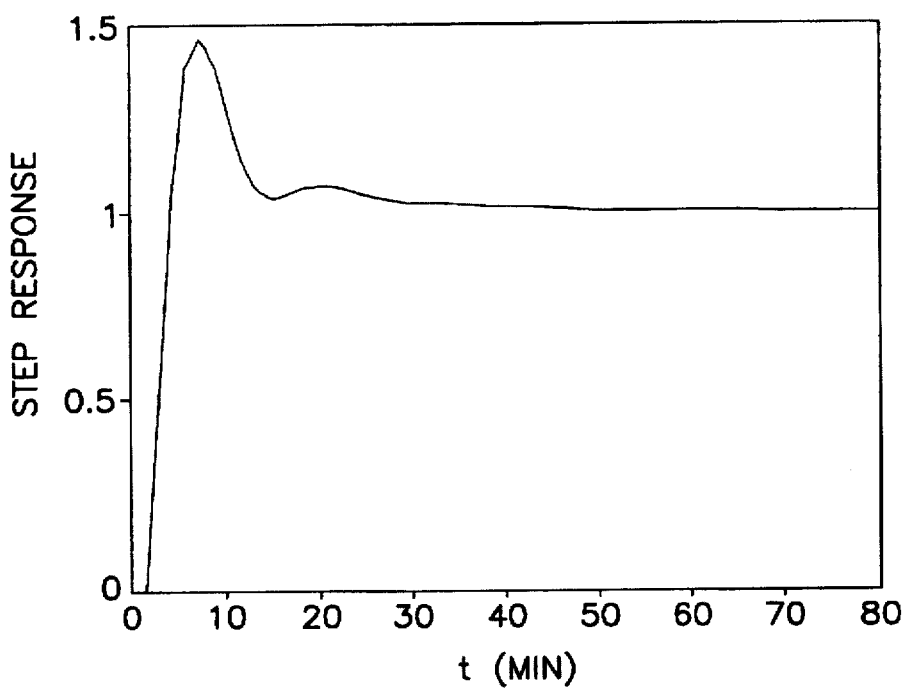
FIG. 9 is a graphical representation of a step response of the closed loop system with T=90 seconds.

In order to assess the effect of message interval variations, the step responses of the closed-loop system for T=45 seconds and T=90 seconds were computed as well, and are shown in FIG. 8 and 9, respectively. Though such extreme values are not expected for long durations, the behavior of the step responses still gives a good estimate for what is expected under those circumstances. As is shown in FIGS. 8 and 9, stability is preserved in both cases. The settling times are changed to about 20 minutes and 40 minutes respectively. The overshoot is a little affected for T=45 seconds, but increases to 50% for T=90 seconds.

Figure 10:
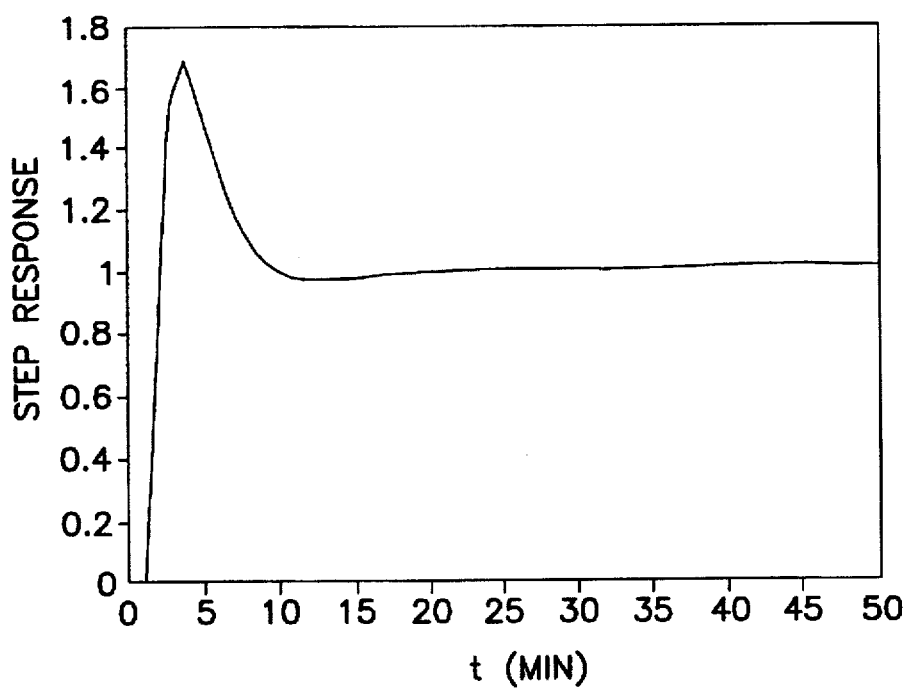
FIG. 10 is a graphical representation of a step response of the step response of the closed loop system with varying gain.

The settling time is further decreased by letting the gains vary during the first few minutes after lock. This is achieved at the expense of an increased overshoot. We chose, as a result of a trial-and-error procedure, the following schedule for $K_1$:

$$K_1(n) = \begin{cases} 0.013 - 0.002n, & 0 \le n \le 4 \\ 0.005, & n > 4 \end{cases}, \quad (5)$$

where n=0 corresponds to the first received message after lock. The gain $K_2$ is kept fixed at 0.0005. The step response with this scheme is shown in FIG. 10. As is shown in FIG. 10, the settling time has decreased from 30 minutes to 10 minutes, but the overshoot is now 70% instead of 35%.

Another parameter of interest is the noise amplification (NA) of the system, given by the formula $$NA = \left[\frac{1}{2\pi} \int_{-\pi}^{\pi} |C(e^{i\omega})|^2 d\omega \right]^{1/2} \quad (6)$$

The NA parameter expresses the increase (or decrease) in the standard deviation of the jitter noise at the output. With the values of the gains given in equation (4) and T=60 seconds, the noise amplification is 0.6. For T=45 seconds, the noise amplification decreases to 0.5, while for T=90 seconds it increases to 0.84.

Detailed Description of the Synchronization Algorithm

The RMU maintains a message data base for the received messages, the BS times for these messages, and the corresponding RMU times. Whenever a message is received, the RMU samples its own time and stores it, together with the message number, for future use. If this message also contains timing information about the previous message, the RMU consults its data base to see if the previous message was also received. If so, an error signal ε is generated by subtracting the two times, and forwarded to the controller, as described more fully below. If the received message contains only the message number without time information, this information is still useful since it can serve for error computation when the next message is received.

A modification of the above scheme facilitates a slight enhancement of performance when there are misses. Instead of transmitting only the time of the previous message, the BS can transmit the times of the two or more previous messages. Then, if a message is missing, the message after it is still useful for error generation. This reduces the gap created by the miss to two, instead of three if this scheme is not used.

Initialization of the tracking loop requires the setting the RMU counter to the proper time and initialization the integrator of the controller to the estimated crystal drift. One message is sufficient for setting the RMU counter to the proper time but at least two messages are needed for initialization the integrator of the controller. There are two initialization options: one based on two messages, and one based on three messages. The former is computationally simple, but not very, accurate. The latter is more complicated to implement, but is more accurate.

Let $\{\epsilon(1), \epsilon(2), \ldots\}$ be the sequence of generated errors, starting at power startup or after lock break, and let $\{t(1), t(2), \ldots\}$ be the corresponding times. Then the two-message estimate of the drift β is $$\beta = \frac{\epsilon(2) - \epsilon(1)}{t(2) - t(1)} \quad (7)$$

and the message estimate is $$\beta = \frac{[2t(1) - t(2) - t(3)]\epsilon(1) + [2t(2) - t(1) - t(3)]\epsilon(2) + [2t(3) - t(2) - t(1)]\epsilon(3)}{2[t(2) - t(1)]^2 + 2[t(3) - t(2)]^2 + 2[t(2) - t(1)][t(3) - t(2)]}, \quad (8)$$

The estimated β is forwarded to the controller to initialize its state as described more fully below. The RMU time is set to the last received BS time so that the last ε becomes zero, plus a correction equal to the product of β times the time elapsed since the last received BS time.

Controller Algorithm

The controller performs the following two computations each time an signal ε is received from the message data base:

$$s = s + K_2 \epsilon \quad (9)$$

$$u = s + K_1 \epsilon. \quad (10)$$

The variable s is the state of the controller, initialized to the estimated β, as described above. The values of the gains $K_1$ and $K_2$ are also as described above. The output u is forwarded to the counter via an intermediate algorithm called the bank, as described below.

The RMU counter has 16 bits and is fed from a 62.5 KHz dock, nominal frequency. Thus, each count represents 16 microseconds. Those skilled in the art will readily recognize that other clock frequencies could be selected. Whenever the count reaches 56,250 (corresponding to 0.9 second), it is reset to 0 and an interrupt is sent to the microcontroller, which keeps track of the number of intervals of 0.9 second. When the dock frequency varies, the true interval is no longer 0.9 second. The mechanism for correcting this is changing the number 56,250 to a different number c, depending on the controller output u, such that the time interval will revert to 0.9 second. This is accomplished through the bank algorithm.

In the bank algorithm, one count in 56,250 represents about 18 ppm. This is too crude to use directly, since we are interested in correcting the drift up to a small fraction of ppm. This is accomplished by spreading the correction over many cycles, so as to make it exact on the average. The bank algorithm does this as follows:

1. Compute the desired count value of the RMU counter as a function of u. This number is not an integer in general.
2. Take the integer part of the result to the nearest integer, and send the result to the RMU counter for use in the next cycle. The remainder, a fraction in the range −0.5 to 0.5, is saved as a "debt" for the next cycle.
3. At the next cycle, the "debt" is added to the non-integer result before rounding. Repeat the sequence.

The bank algorithm is thus as follows where the variable d represents the debt variable, and the variable c the output to the counter:

$$x = 56.250 + 56,250u + d \quad (11)$$

$$c = \text{round}(x) \quad (12)$$

$$d = x - c. \quad (13)$$

This algorithm is performed every 0.9 second. The input value u is updated much less frequently, every one minute on the average.

It may happen that tracking becomes so poor that it is better to break lock and re-initialize the loop. Typically this happens in two cases. If after a long period of missed messages, the drift estimate is not good enough, we force a break and reinitialize. Also, if the drift varies suddenly (or rapidly), due to sudden temperature change or mechanical shock, we force a break and reinitialize. The criterion for lock break is based on the behavior of ε. Thus, a break is forced in one of the following two cases: (a) two consecutive ε's are larger than 500 microseconds in absolute value or (b) lack of reception of time messages within four minutes.

Calculation Results

The synchronization loop was calculated (using a program called Matlab) and tested under the following conditions:

1. Statistical distribution of the message interval: according to the density function:

$$p(\tau) = \frac{1}{15} \exp\left\{ -\frac{\tau - 45}{15} \right\} + 0.05\delta(\tau - 90), 45 \leq \tau < 90. \quad (14)$$

In other words, the delay has 95% probability of being exponentially distributed in the range [45, 90] seconds, with a mean 15 seconds, and 5% probability of being 90 seconds.

2. Message contents: if $45 \leq \tau < 90$, the message contains the message number, and the times of the previous two messages. If $\tau = 90$, it contains only the message number.

3. Probability of missing messages: $P_{miss} = 5\%$.

4. Initial drift: randomly generated, uniformly distributed in the range ±100 ppm.

5. Drift dynamics: random walk, uniform distribution in the range ±0.01 ppm every 0.9 second.

6. Jitter error: uniformly distributed in the range ±96 microseconds, quantized to an integer multiple of 16 microseconds.

7. Initialization: using the formula (8) based on 3 measurements.

8. Run duration: 100 messages (about 100 minutes on the average).

9. Number of runs: 500.

10. Error accumulation for statistics computations: every 0.9 second, discarding the first 6 loop iterations of each run (i.e., the statistics represent the steady-state, not the transient phase after initialization).

Figure 11:
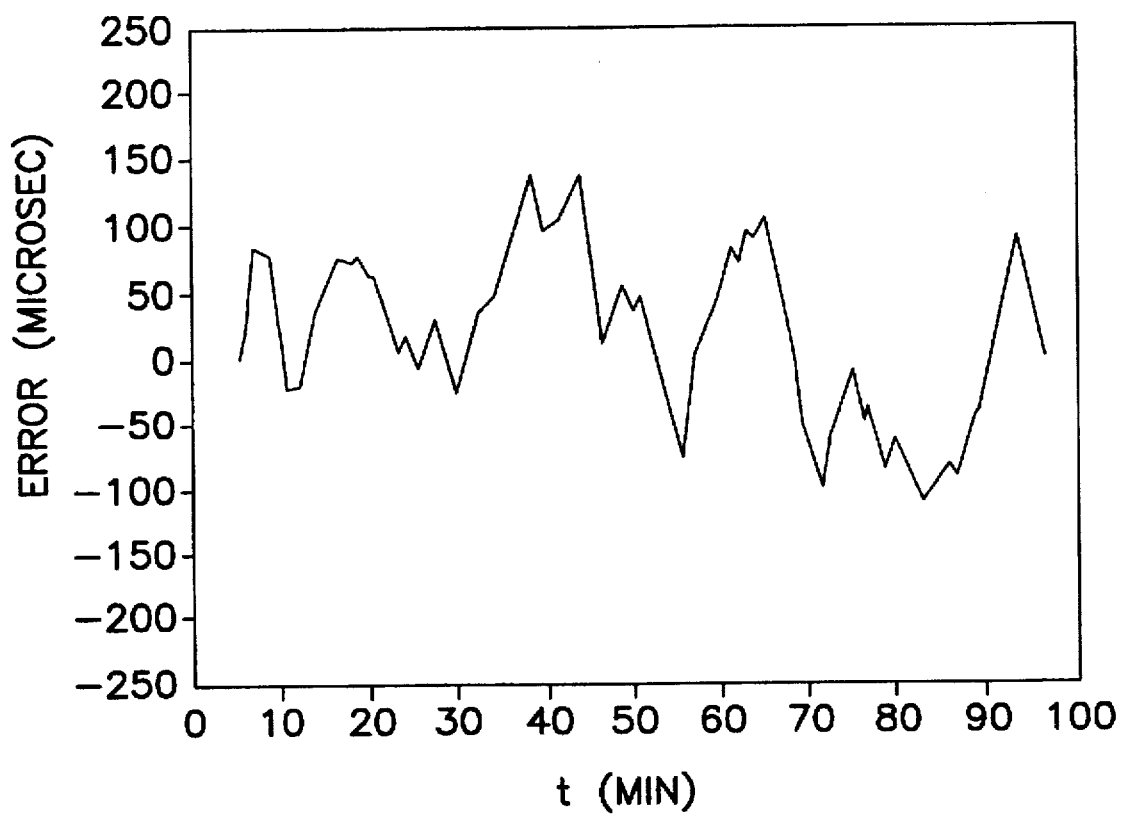
FIG. 11 is a graphical representation of the typical behavior of the synchronization error calculated through calculation.

The behavior of the error in a typical run is shown in FIG. 11. The error appears as a thick line because of the fast jitter due to the bank algorithm having a period of 0.9 seconds. The limits on the graph of FIG. 11 represent the ±250 microsecond limits. As is shown below, the error is well within these limits, a phenomenon typical to most runs. The following statistics were computed from the 500 runs:

1. RMS error: 56 microseconds.

2. Percent of time the error was greater than 250 microseconds: 0.12%

3. The 90% error quantile: ±88 microseconds.

4. The 99.7% error quantile: ±220 microseconds.

In summary, the synchronization loop performs well within the requirements, under the assumptions specified above.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A remote mobile two-way pager using frequency hopped spread spectrum communication, comprising:

a paging receiver for receiving a serial plurality of time-of-day packets at non-deterministic intervals, each of said packets containing a time of transmission of a previous time-of-day packet;

an internal clock;

an error counter;

a processor connected to the receiver, the internal clock and the error counter and operable for:

generating an error value based upon a difference in a measured time of reception of each of the serial plurality of time-of-day packets and the time of transmission contained in each of the serial plurality of time-of-day packets;

placing the error value on the error counter;

building a history of previous times of transmissions from the plurality of packets of information;

extrapolating a current time of day from the history of previous times of transmissions, periodically correcting the internal clock with the error counter to within ±250 microsecond accuracy; and a frequency hopped spread spectrum transmitter connected to the internal clock and the control means for synchronizing the frequency hopping sequence with a base station.

2. The remote mobile two way pager of claim 1, wherein the processor is further operable for extrapolating a current time of day, by performing the processing steps of:

measuring a measured time of reception for each of the plurality of time-of-day packets using the internal clock;

storing the measured time of reception for each of the plurality of time-of-day packets received;

extracting the exact time of transmission from each of the plurality of time-of-day packets of information;

storing the exact time of transmission with the measured time of reception for each of the plurality of packets of information;

generating an error factor based upon the difference between the exact time of transmission and the measured time of reception for at least two of the plurality of packets of information; and correcting the internal time-of-day clock with the error factor.

3. The remote mobile two-way pager of claim 2, wherein the processor is further operable for correcting the internal time-of-day clock by performing the processing steps of:

13a) computing a count value of a timing counter based upon the error factor;

13b) rounding the count value to a nearest integer to produce a rounded count value;

13c) correcting the internal time-of-day clock using the rounded count value;

13d) saving the remainder of the rounded count value as a debt for the next cycle;

13e) adding the debt to the count value; and 13f) continually repeat processing steps 13a though 13e such that the correction of the time-of-day clock is performed in a gradual and stable fashion.

* * * * *